US012293267B1

(12) United States Patent
Agrawal

(10) Patent No.: US 12,293,267 B1
(45) Date of Patent: *May 6, 2025

(54) AI-ASSISTED REMOTE GUIDANCE USING AUGMENTED REALITY

(71) Applicant: Ishita Agrawal, Westford, MA (US)

(72) Inventor: Ishita Agrawal, Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,515

(22) Filed: Apr. 26, 2024

Related U.S. Application Data

(63) Continuation of application No. 18/391,994, filed on Dec. 21, 2023, now Pat. No. 12,008,451.

(51) Int. Cl.
*G06N 20/00* (2019.01)
*G06F 3/01* (2006.01)
(Continued)

(52) U.S. Cl.
CPC ............ *G06N 20/00* (2019.01); *G06F 3/011* (2013.01); *G06T 19/006* (2013.01); *G06F 3/0487* (2013.01)

(58) Field of Classification Search
CPC ........ G06N 20/00; G06N 20/10; G06N 20/20; G06N 3/126; G06N 5/046; G06T 19/006; G06T 17/20; G06F 3/011; G06F 3/0487; G06F 3/04812; G06F 13/20; G06Q 20/3674; H04L 67/12
See application file for complete search history.

(56) References Cited

U.S. PATENT DOCUMENTS

| | | | |
|---|---|---|---|
| 11,562,153 B1 * | 1/2023 | Etwaru | G06F 40/58 |
| 11,922,589 B2 * | 3/2024 | McBain | G06T 17/20 |

(Continued)

FOREIGN PATENT DOCUMENTS

| | | | | |
|---|---|---|---|---|
| CA | 2953335 C | * | 1/2021 | ......... G02B 27/0093 |
| CA | 3153935 A1 | * | 3/2021 | ............ G05B 15/02 |

(Continued)

OTHER PUBLICATIONS

Klein and Murray, "Parallel Tracking and Mapping for Small AR Workspaces," 6th IEEE and ACM International Symposium on Mixed and Augmented Reality, Nara, Japan, 2007, 225-234.

(Continued)

*Primary Examiner* — Steven P Sax
(74) *Attorney, Agent, or Firm* — Fish & Richardson P.C.

(57) ABSTRACT

Technology embodied in a computer-implemented method for receiving a multi-modal input representing a query associated with a physical object, processing the multi-modal input to identify the physical object, and determining, based in part on an identification of the physical object and by accessing a language processing model, at least one response to the query associated with the physical object. The method also includes determining a sequence of actions associated with the at least one response, the sequence including at least one action that involves an interaction with at least one portion of the physical object. The method further includes generating a digital representation of the at least one action, and providing the digital representation to a user-device for presentation on a display. The digital representation includes a gesture-icon representing the action, the gesture-icon being overlaid on a digital twin of the physical object.

18 Claims, 7 Drawing Sheets

(51) Int. Cl.
   *G06T 19/00*   (2011.01)
   *G06F 3/0487*   (2013.01)

(56) References Cited

U.S. PATENT DOCUMENTS

| | | | | |
|---|---|---|---|---|
| 12,008,451 | B1 | 6/2024 | Agrawal | |
| 2016/0328883 | A1* | 11/2016 | Parfenov | G06T 17/00 |
| 2023/0019745 | A1* | 1/2023 | Sawhney | G06T 19/006 |
| 2023/0115887 | A1* | 4/2023 | Tan | G06T 19/006 |
| | | | | 345/633 |
| 2023/0157762 | A1* | 5/2023 | Braido | A61B 34/37 |
| | | | | 600/424 |
| 2023/0169738 | A1* | 6/2023 | Paulson | G06T 19/00 |
| | | | | 345/633 |
| 2023/0196230 | A1* | 6/2023 | Cella | G06V 10/82 |
| | | | | 705/7.17 |
| 2023/0196688 | A1* | 6/2023 | Kobel | G06Q 30/0641 |
| | | | | 345/633 |
| 2023/0281527 | A1* | 9/2023 | Cella | G06V 20/17 |
| | | | | 705/7.17 |
| 2023/0419304 | A1* | 12/2023 | Cella | G06N 3/0442 |
| 2024/0036636 | A1* | 2/2024 | Press | G02B 30/56 |
| 2024/0054264 | A1* | 2/2024 | Harvey | G06T 11/00 |

FOREIGN PATENT DOCUMENTS

| | | | | |
|---|---|---|---|---|
| CA | 2979560 | C * | 11/2023 | A63F 13/211 |
| CN | 116859850 | A * | 10/2023 | |
| CN | 117389647 | A * | 1/2024 | |
| CN | 117499819 | A * | 2/2024 | |
| CN | 117631821 | A * | 3/2024 | |
| JP | 2023500378 | A * | 7/2023 | |
| KR | 20230173381 | A * | 12/2023 | |
| KR | 102642668 | B1 * | 3/2024 | |
| WO | WO-2024025863 | A1 * | 2/2024 | G06Q 10/04 |

OTHER PUBLICATIONS

NSFlow.com [online], "Introduction to AR Remote Assistance," available on or before May 21, 2023, retrieved on Feb. 6, 2024, retrieved from URL: <https://nsflow.com/blog/augmented-reality-remote-assistance>, 7 pages.

Splashtop.com [online], "Augmented Reality Is a Game Changer for Remote Support," available on or before Nov. 20, 2023, retrieved on Feb. 6, 2024, retrieved from URL: <https://www.splashtop.com/blog/augmented-reality-game-changer-for-remote-support>, 11 pages.

Teamviewer.com [online], "Share instant virtual expertise with the help of augmented reality," available on or before Dec. 20, 2023, retrieved on Feb. 6, 2024, retrieved from URL: <https://www.teamviewer.com/en-us/products/frontline/solutions/xassist/?utm_source=google&utm_medium=cpc&utm_campaign=us%7Cnb%7Cpr%7C23%7Caug%7CFrontline-xAssist%7Ct0%7C00&utm_content-Frontline-xAssist&utm_term=augmented+reality+solution&gad_source=1&gclid=Cj0KCQiAwvKtBhDrARIsAJj-kTgfv9bzSKNX_5ewoUruU-j0-YixjtTlD47iFBiTk7FrnrHlboj6eBUaAnFIEALw_wcB>, 7 pages.

TechSee.me [online], " Augmented Reality (AR) Remote Assistance: Definition, Applications & Benefits," available on or before Mar. 2, 2022, retrieved on Feb. 6, 2024, retrieved from URL: <https://techsee.me/blog/augmented-reality-remote-assistance/>, 15 pages.

Viewar.com [online], "HELPAR—Provide remote assistance empowered with AR," Feb. 4, 2023, retrieved on Feb. 2, 2024, retrieved from URL <https://www.viewar.com/products/helpar/>, 9 pages.

Zoho.com [online], "Augmented Reality Remote Assistance Software," available on or before Sep. 9, 2021, via Internet Archive: Wayback Machine URL: <https://web.archive.org/web/20210909175930/https://www.zoho.com/lens/>, retrieved on Feb. 6, 2024, retrieved from URL: <https://www.zoho.com/lens/>, 6 pages.

* cited by examiner

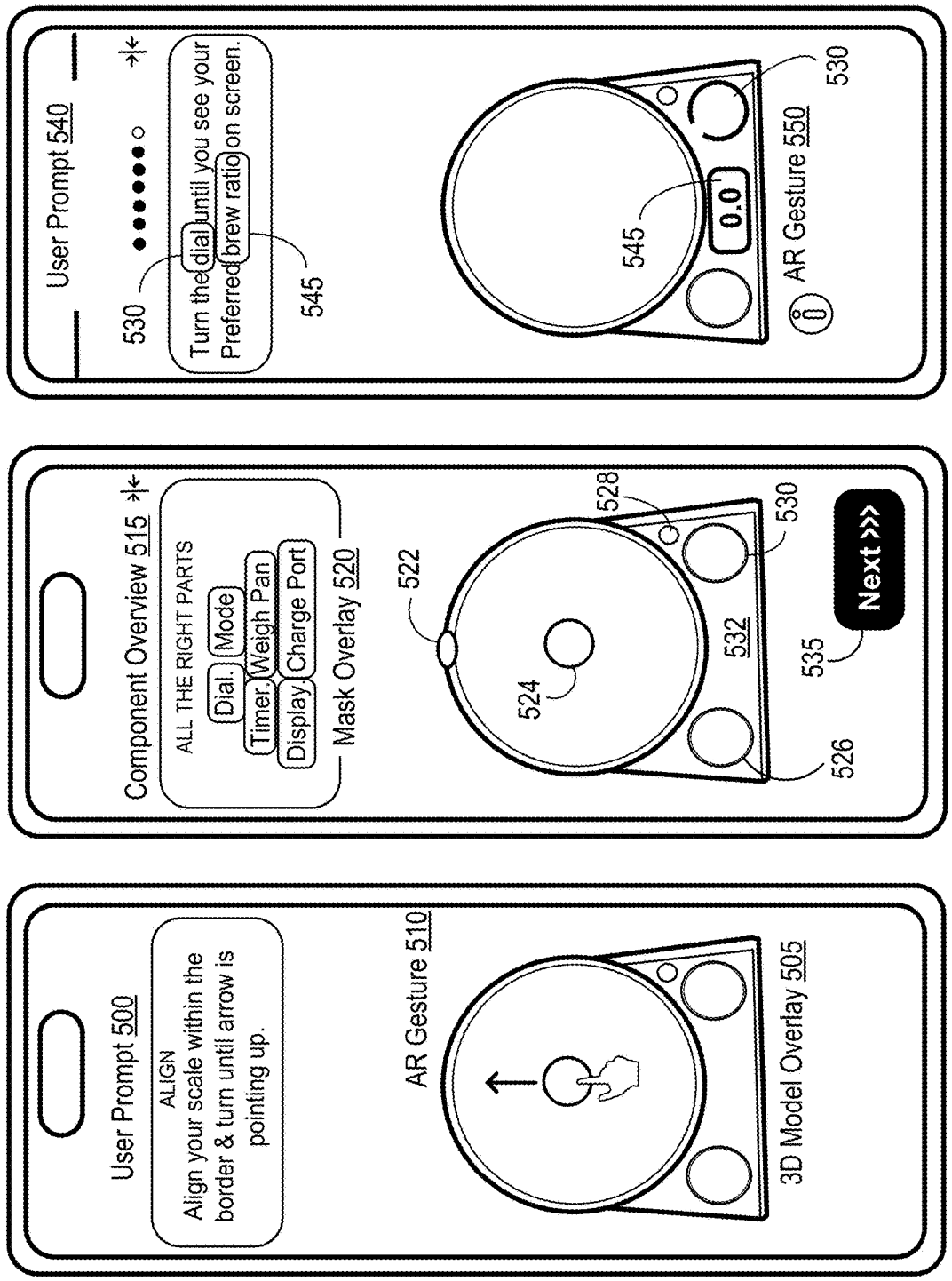

AI-ASSISTED REMOTE GUIDANCE USING AUGMENTED REALITY

CLAIM OF PRIORITY

This application is a continuation of U.S. patent application Ser. No. 18/391,994, filed on Dec. 21, 2023, the entire contents of which are hereby incorporated by reference.

BACKGROUND

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a remote guidance system that can provide artificial-intelligence (AI) assistance to a user-device using augmented reality in response to a query with respect to a physical object. In particular, this specification describes technology that leverages the power of artificial intelligence, e.g., by using a large language model (LLM), to generate an augmented reality (AR) experience to provide remote guidance with respect to a physical object, e.g., a consumer electronics device, piece of furniture, vehicle, pair of glasses, etc. The AR experience can demonstrate one or more actions the user can take with regards to the physical object. This can include, for example, providing do-it-yourself (DIY) advice in response to a query about the physical object, where actions to be performed on the physical object are displayed as animations in a corresponding digital representation of the physical object, e.g., a digital twin, that is generated based on the query using artificial intelligence.

According to a first aspect there is provided a computer-implemented method for receiving, at one or more computing devices, a multi-modal input representing a query associated with a physical object, processing, by the one or more computing devices, the multi-modal input to identify the physical object, and determining, by the one or more computing devices, based in part on an identification of the physical object, at least one response to the query associated with the physical object. The at least one response is identified by accessing a language processing model. The method also includes determining, by the one or more computing devices, a sequence of actions associated with the at least one response. The sequence includes at least one action that involves an interaction with at least one portion of the physical object. The method further includes generating, by the one or more computing devices, a digital representation of the at least one action, and providing the digital representation to a user-device for presentation on a display. The digital representation includes a gesture-icon representing the action, the gesture-icon being overlaid on a digital twin of the physical object.

In another aspect, a system includes one or more computing devices and memory configured to store instructions which when executed, cause the one or more computing devices to perform various operations. The operations include receiving, at the one or more computing devices, a multi-modal input representing a query associated with a physical object, processing, by the one or more computing devices, the multi-modal input to identify the physical object, and determining, by the one or more computing devices, based in part on an identification of the physical object, at least one response to the query associated with the physical object. The at least one response is identified by accessing a language processing model. The operations also include determining, by the one or more computing devices, a sequence of actions associated with the at least one response, the sequence including at least one action that involves an interaction with at least one portion of the physical object, and generating, by the one or more computing devices, a digital representation of the at least one action. The digital representation includes a gesture-icon representing the action, the gesture-icon being overlaid on a digital twin of the physical object. The operations further include providing the digital representation to a user-device for presentation on a display.

In another aspect, a system includes one or more computer-readable media storing instructions that are executable by a processing device, and upon such execution cause the processing device to perform operations that include receiving a multi-modal input representing a query associated with a physical object, processing the multi-modal input to identify the physical object, and determining, based in part on an identification of the physical object, at least one response to the query associated with the physical object, the at least one response being identified by accessing a language processing model. The operations also include determining a sequence of actions associated with the at least one response, the sequence including at least one action that involves an interaction with at least one portion of the physical object, and generating a digital representation of the at least one action The digital representation includes a gesture-icon representing the action, the gesture-icon being overlaid on a digital twin of the physical object. The operations further include providing the digital representation to a user-device for presentation on a display.

Each of the above aspects can include one or more of the following features.

Receiving the multi-modal input can include collecting the multi-modal input at least in part using the user-device. The multi-modal input can include one or more frames of a video and at least one of text or audio component inputs. Processing the multi-modal input to identify the one or more physical objects can include, for each physical object, detecting the physical object in the one or more frames using an identification engine that has been trained to perform object detection, and generate one or more identifiers for the physical object; and obtaining a diagram that includes portions of the detected physical object in accordance with the one or more generated identifiers. Obtaining the diagram can include locating the diagram in a database of diagrams corresponding to various physical objects, or scraping the internet to obtain the diagram. Obtaining the diagram can include generating the diagram using a viewpoint projection model. Determining the sequence of actions associated with the at least one response to the query associated with the physical object by accessing a language processing model can include processing the at least one of text and audio components and the diagram using the language processing model, identifying one or more portions of the diagram in accordance with the response, and generating one or more actions as the sequence of actions using the one or more identified portions of the physical object. The language processing model can be trained to generate the sequence of actions through a prediction task, wherein the training includes training on documentation that includes one or more of frequently asked questions, user manuals, and diagrams for a plurality of physical objects, or training on generic documentation sourced from the internet. The digital twin can include the diagram, and generating the digital representation can include, for each action in the sequence of actions, obtaining, from a gesture-icon library, a respective gesture-icon representing the action, identifying one or more feature points to associate the gesture-icon with the relevant portions of the digital twin, and generating code for a rendering engine configured to render the digital representation overlaid on the digital twin of the physical object using the one or more feature points. Providing the digital representation to the user-device for presentation on a display can include transmitting the digital representation to the user-device; and rendering the digital representation on the display of the user-device as an augmented reality presentation. Upon identifying completion of a first action in the sequence of actions, as represented in the digital representation, a second action in the sequence of actions can be represented in the digital representation.

Particular embodiments of the subject matter described in this specification can be implemented so as to realize one or more of the following advantages.

The technology described herein enables scalable augmented reality for resource-constrained user-devices, e.g., a mobile device. In particular, the system can run on at-edge devices, e.g., user-devices connected to a network, e.g., the internet or an internal network, at low-latencies by animating on top of a digital twin of the identified physical object that is constructed using a known two-dimensional or three-dimensional model instead of detecting and identifying each component of the object using the user-device to build the digital twin in real-time. Animating on top of the constructed digital twin and overlaying the gesture-icons on identified portions that correspond with each action in the sequence of actions requires less power consumption and reduces the computer resources needed to provide the digital representation than detecting each component of the physical object in real-time directly and animating the gesture-icons on a real-time detected digital twin.

By providing AR experiences that are tailored in response to specific queries, the technology described herein provides for a high-quality user-experience that potentially obviates the need to read lengthy instruction manuals or sift through an overwhelming quantity of search results. Rather, the technology described herein leverages language processing models, such as a large language model, to generate tailored digital representations in response to queries to generate visual/AR experiences to provide the high-quality user-experiences. For example, the language processing model can be leveraged to generate code that can be executed to visually render the sequence of actions as a digital representation that includes gesture-icons overlayed on a digital twin of the physical object.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-5F are examples of a digital representations provided by the system superimposed over a digital twin of the digital coffee weight scale of FIG. 3 in response to a user query regarding the weight scale.

Like reference numbers and designations in the various drawings indicate like elements.

DETAILED DESCRIPTION

Figure 1:
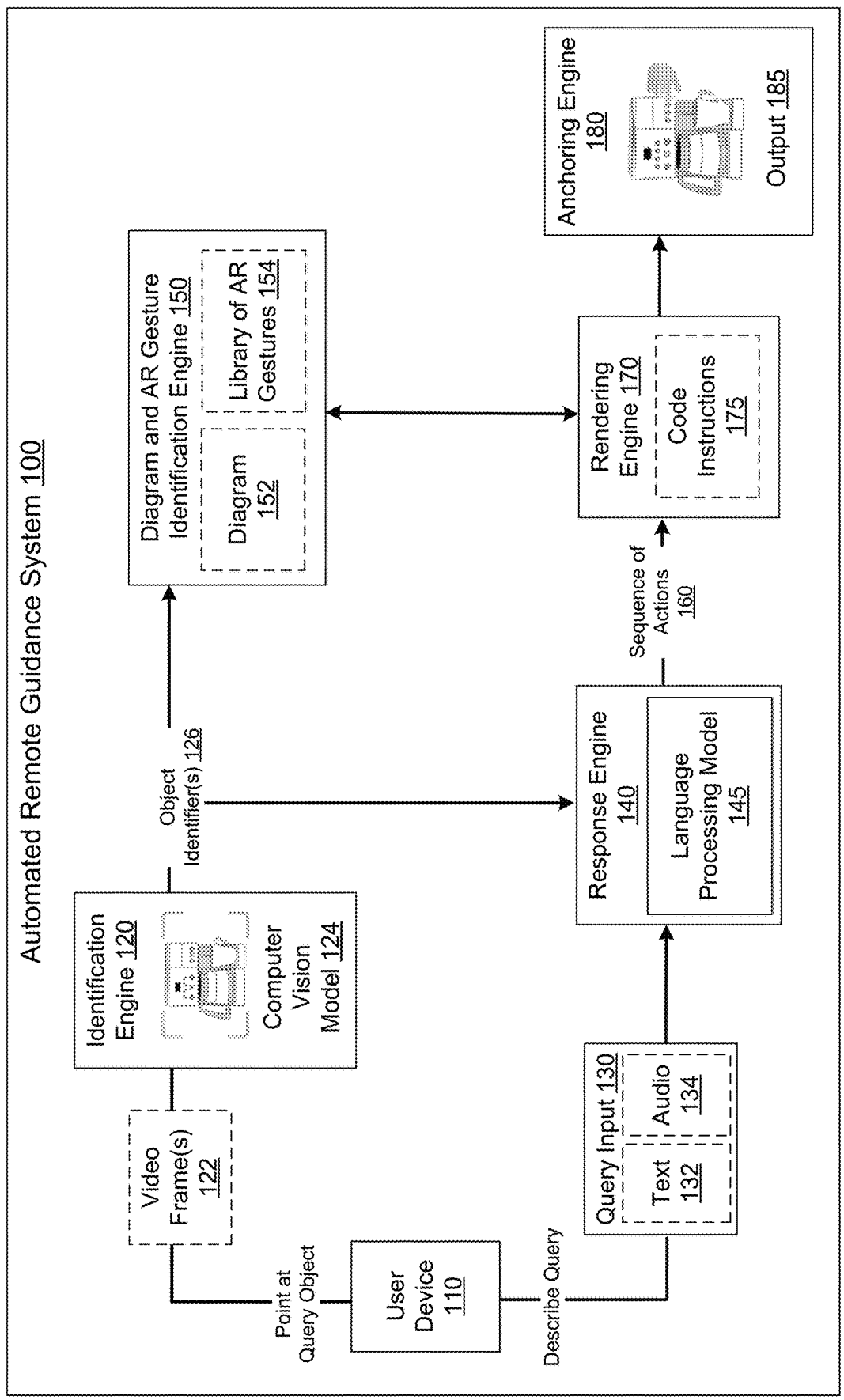
FIG. 1 is an example of an automated remote guidance system that can be used to implement the technology described herein.

This specification describes a system that can receive and process a query, e.g., a question or statement the user has regarding a physical object, e.g., a consumer physical object. As an example, the query can be a question: "How do I empty my vacuum?", or a statement "The pilot light on the stove won't go off." In some cases, the query may also be presented via images/videos where a user captures the images/videos for the system to infer the query/issue by analyzing the images/videos. The system can collect the query from a user-device, e.g., a cell phone, smart glasses, a tablet, etc., and determine a response to the query that can be provided as a digital representation of a sequence of actions overlayed on a digital twin of the physical object. In this specification, a digital twin is a 2D or 3D digital model of a physical object, e.g., a 2D or 3D digital diagram of labelled components of the physical object. In some cases, the diagram can be obtained from a database of diagrams maintained by the system. In some cases, the diagram can be obtained from the internet, e.g., using an internet search or automated scraping process.

The system can process a multi-modal input including one or more input types from the user, e.g., collected using the user-device. In particular, the multi-modal input can include one or more frames from a video collected using the user-device of the physical object and either text, audio, or both text and audio components that specify the query. In particular, the query input can be a recorded audio component from the microphone of a user-device, e.g., a smart phone, or text input into a text field to an applied-programming interface (API) provided by the system to the user-device. The system can process the one or more frames from the video to identify the physical object and then identify the corresponding diagram for the specific physical object. In some cases, the system can also identify a library of augmented reality (AR) gestures for the specific physical object or for the brand of the physical object that can be associated with the diagram through the sequence of actions.

The system can then process the identified physical object and the query, e.g., either text, audio, or both text and audio components, to generate a sequence of actions that can be rendered by a rendering engine, e.g., using the API, as a digital representation. In some implementations, the system includes a language processing model, e.g., a large language model, configured to process the query and the identification of the physical object to generate the sequence of actions as a response to the query. The rendering engine can construct a digital twin of the physical object, e.g., using the identified diagram, and then identify one or more portions, e.g., labelled components, of the diagram in accordance with the generated sequence of actions. In particular, the system can generate the digital representation by obtaining respective gesture-icons representing each of the actions in the sequence, e.g., from the library of AR gestures, and producing code that renders the digital representation overlaid on a digital twin of the physical object when executed.

In some implementations, the digital representation, e.g., the digital twin and corresponding gesture-icons, are overlaid on an image/video of the physical object on the user-device, e.g., a display of the user-device to create an AR experience for the user. Various components of the digital twin may be tagged (e.g., via a manual or automatic tagging process) such that the tags may appear within the AR experience overlaid on the image/video of the physical object. For example, such tags may identify for a user a power button, a removable cap, a battery compartment, and other such components of the corresponding physical objects. The overlay of the digital representation on the image/video of the physical object can be done by anchoring portions of the digital representation on corresponding portions of the physical object as seen in the image/video, which in turn allows for easy scaling of the AR experience. For example, animating digital gesture-icons representing particular actions is easier to implement on a digital twin as compared to directly on the image/video of the corresponding physical object. In particular, if the image/video of the physical object keeps changing in size and/or perspective (e.g., due to relative movement between the user-device and the object), animating the gesture icons directly on the image/video requires continuous identification of relevant portions of the physical object in the dynamic image/video. This can be resource intensive and/or inaccurate—especially when performed using resource-constrained computing environments of mobile devices. In contrast, the technology described herein avoids the need for such dynamic adjustments by animating the gesture-icons over a digital twin that is constructed from a known 2D or 3D diagram. Therefore, any changes in size and/or perspective are accounted for by simply adjusting the anchor points for overlaying the digital twin on the dynamic image/video of the physical object to provide the digital representation. This in turn makes the AR experience more easily scalable and less resource intensive as compared to animating the gesture-icons directly on the dynamic image/video. In some cases, the animations may be more accurate, thereby resulting in an enriched user-experience.

FIG. 1 shows an example automated remote guidance system 100 that can be used to implement the technology described herein. The automated remote guidance system 100 can provide remote guidance to a user regarding a query the user has with respect to a physical object, e.g., a consumer physical object, using augmented reality (AR). In particular, the AR can include a digital representation that displays an interaction the user can take with the physical object on a user-device 110.

As an example, the physical object can be one or more pieces of furniture, e.g., a couch, a dining room set, etc., the query can be asking how to build the furniture, and the advice can include providing instructions on how to assemble the furniture using the digital representation. In the particular example of a user wanting to know how to build a couch, the system can provide a digital representation, e.g., a gesture-icon overlayed on a digital twin of the parts of the couch, that corresponds with an action to identify the base, back, and pedestal legs of the couch as part of a sequence of instructions for assembly.

As another example, the physical object can be a consumer electronic device, e.g., a coffee maker, a laptop, a smart watch, etc., the query can be a description of an issue that the user is having with the device, and the advice can include providing solutions to the issue. In the particular example of a smart-watch, the query can describe an issue the user is having attaching a new watch band to the smart-watch, and the system can provide a digital representation that corresponds with a gesture-icon action to use a screwdriver to remove the screws of the previous watch band overlayed on a digital twin of the smart-watch as part of a sequence of instructions.

In some implementations, the automated remote guidance system 100 can process a multi-modal input collected from a user-device 110, including a query input 130 and one or more frames of a video input 122 to generate a query response. The query input 130 can include text 132, audio 134, or both text 132 and audio inputs 134 and the one or more video frames 122 can include a depiction of the physical object. As a particular example of the multi-modal input, the user can point or direct the camera of the user-device 110 toward the physical object in question to collect the one or more video frames 122 and describe the query 130 regarding the object. In some implementations, the user-device 110 can include one or more input devices to capture each of the multi-modal input-types, e.g., a camera to capture one or more video frames 122, a microphone to capture the audio input 134, and a keyboard to capture the text input 132. In some implementations, the user-device 110 can be a cellphone, a smart lens, a tablet, computer, etc.

The system 100 can process the one or more video frames 122 from the user-device 110 using an identification engine 120. In some implementations, the identification engine 120 can be configured to process the one or more video frames 122, e.g., depicting the physical object in question, to generate one or more identifiers for the physical object 126. As an example, the identifiers for the physical object 126 can include a make and model of the physical object, a brand name and a serial number, a stock keeping unit (SKU), universal product code (UPC), etc. The system 100 can then use the generated object identifiers 126 to obtain a diagram of the physical object 152, e.g., a two-(2D) or three-dimensional (3D) model, and the appropriate augmented reality gestures 154, e.g., the gesture-icons for the physical object, as will be described in more detail below.

In some cases, the identification engine 120 can include a computer vision model 124, e.g., a neural network that has been trained to perform object detection. In particular, the computer vision model 124 can process the one or more video frame(s) 122 to generate the one or more identifiers for the physical object 126. In this case, the neural network can have any appropriate number of neural network layers (e.g., 1 layer, 5 layers, or 10 layers) of any appropriate type (e.g., fully connected layers, attention layers, convolutional layers, etc.) connected in any appropriate configuration (e.g., as a linear sequence of layers, or as a directed graph of layers). As a particular example, the computer vision model 124 can be a multi-layer perceptron (MLP), convolutional neural network (CNN), ResNet, or detection transformer. In some cases, the computer vision model 124 can have been trained to perform object detection on a dataset of consumer physical objects. In some cases, the computer vision model 124 can have been trained to perform object detection on a generic open-source dataset and finetuned on an object detection task regarding consumer physical objects. The computer vision model can be used to generate one or more object identifiers 126 that represent the output of the object detection process.

The system 100 can process the query input 130, e.g., one or more of the text 132 and audio 134 inputs, along with the object identifiers 126 provided by the identification engine 120 using a response engine 140. In particular, the response engine 140 can be configured to process the query input 130 and the object identifiers to generate a sequence of actions 160 as the response to the query. In some cases, the query input 130 can be provided to the system 100 using an applied-programming interface (API) of the system.

As an example, the query 130 can be a recorded audio input 134 describing an issue a user is having with a coffeemaker. For example, the query 130 can be a question such as: "why is the clean filter light on even though I just changed the filter?" Correspondingly, the sequence of actions 160 can relate to steps the user can undertake to address the issue—e.g., taking the filter out and putting it back in, resetting the machine, etc.—as a response to address the filter light warning. As another example, the query 130 can be a text input 132 in which the user types out a query with regard to functionalities of a device such as an air fryer. In this example, the query 130 can include the typed text input 132 "uses of air fryer," and correspondingly, the sequence of actions 160 as response can define multiple uses to demonstrate the functionality of the air fryer.

In the particular example depicted, the response engine 140 includes a language processing model 145 configured to process a multi-modal input, e.g., the query input 130 and the object identifiers 126 from the identification engine 120, to predict the sequence of actions 160. In some cases, the system 100 can use the language processing model 145 to generate code encoding the sequence of actions 160 for a rendering engine 170. An example of the language processing model 145 predicting the sequence of actions as code will be covered in further detail in FIG. 4. In some cases, the system 100 can use the language processing model 145 to generate text describing the sequence of actions 160 for the rendering engine 170.

As a particular example, the language processing model 145 can be an autoregressive machine learning model, e.g., a model with a recurrent neural network architecture that is configured to autoregressively process a multi-modal input and generate a sequence of actions 160. In some implementations, the language processing model 145 can be a recurrent neural network (RNN), long short-term memory (LSTM), or gated-recurrent unit (GRU). In some implementations, the language processing model 145 can be a transformer that uses a multi-headed attention mechanism to define a likelihood score distribution over next elements, e.g., characters, words, or paragraphs. In particular, the language processing model 145 can be a large language encoder-decoder or decoder-only model that has been trained on a corpus of documents to perform next-element prediction. Large language models are considered state of the art in the natural language processing domain, since large language models can demonstrate an understanding of the nuances of semantic meaning in a given input, e.g., the query input 130, and can process multi-modal inputs, e.g., the text 132 and audio 134 inputs, by tokenizing the different input modalities into same-size embeddings.

In the particular example depicted, the system can further process the object identifiers 126 using a diagram and AR gesture identification engine 150. In some cases, the diagram and AR gesture identification engine 150 can use the object identifiers 126 to obtain a diagram 152, e.g., a 2D or 3D model of the physical object, e.g., from a diagram database by matching one or more database keys with the object identifiers 126. The diagram 152 can be used to provide a digital twin of the physical object for the digital representation, as will be described in further detail below. An example of matching the one or more object identifiers 126 using a database will be covered in more detail with respect to FIG. 2. In some cases, the diagram 152 for the particular object can be sourced from the internet, e.g., by searching or scraping in accordance with the one or more object identifiers 126.

The diagram and AR gesture identification engine 150 can additionally identify a corresponding library of AR gestures 154, e.g., an organized grouping of one or more gesture-icons that can be used in the digital representation of the query response. In particular, the gesture-icons can be associated with the one or more actions in the sequence of actions generated by the response engine 140 and overlayed on the digital twin of the physical object. As an example, a gesture-icon can include gestures depicting an interaction with the physical object, e.g., a hand pointing, a hand pushing, or a hand pulling. As another example, a gesture-icon can include an item that is not an action, but that the physical object can interact with in one or more ways. For example, in the case that the physical object is a blender, a gesture-icon can include a depiction of fruit, milk, or juice, which can be poured into the blender. In some cases, the gestures can be provided by a specific manufacturer, e.g., as brand-specific gesture-icons. In some cases, the gestures can be generic for use with any physical object, manufacturer, or both. In some implementations, the gestures may be custom-generated—potentially in real-time—for example, based on the corresponding physical objects.

The rendering engine 170 can process the sequence of actions 160 generated by the response engine 140 and interact with the diagram and AR gesture identification engine 150, e.g., by using the diagram 152 and the library of AR gestures 154, to execute code instructions 175 as a digital representation. More specifically, the digital representation, e.g., the gesture-icons overlayed on the digital twin of the physical object, can be rendered using the rendering engine 170, e.g., by executing the code instructions 175. The code 175 can be provided in various coding language, e.g., Python, Javascript, OCaml, C#, etc., that the rendering engine 170 can be configured to execute and render. In some cases, the sequence of actions as 160 from the response engine 140 can include the code instructions 175. In some cases, the rendering engine 170 can include a model that processes the sequence of actions 170, e.g., as text, from the response engine 140 to generate the code instructions 175, e.g., using an additional language processing model (not depicted).

In some implementations, the code instructions 175 can specify a specific gesture-icon for each action in the sequence of actions 170 wherein each gesture-icon is rendered on the appropriate portion of the digital twin of the physical object, e.g., as provided by the diagram 152, e.g., the 2D or 3D model, sourced by the diagram and AR gesture identification engine 150. In this case, the rendering engine 170 can access either the diagram 152, the library of AR gestures 154, or both multiple times to execute the code instructions 175. As a particular example, in the case of a user querying how to use an air fryer, the code instructions 175 can include code that specifies the execution of the rendering of a digital representation of an AR gesture-icon for opening the air fryer overlayed on a digital twin of the air fryer.

The rendering engine 160 can be executed fully or in part on the user-device 110. In particular, the user-device 110 can contain a display on which the rendering engine 170 can render the digital representation as specified by the code instructions 175. In this case, the system 100 can share the code instructions to the rendering engine 170 using a network, e.g., the internet. The user can view the rendered output 185 and interact with the physical object as shown in the digital representation of the rendered output 185 in order to address their query 130.

In some cases, the user can view the digital representation on the display of the user-device 110 to follow the code instructions 175, e.g., without the system 100 requesting that the user align the camera of the user-device 110 with the physical object. In some cases, such as the example depicted, the system can further anchor the rendered digital representation on an image of the physical object, e.g., an image provided by the user-device camera on the display of the user-device 110, when the camera is directed towards the physical object using an anchoring engine 180. In this case, the system 100 can autogenerate anchor-points for the physical object to superimpose the digital representation over the anchor-points, e.g., the digital twin, and render the AR gesture-icons on top of the anchored digital twin.

In some implementations, the system 100 can autogenerate anchor-points using an image tracking technique, such as simultaneous localization and mapping (SLAM) using the anchoring engine 180. In particular, the anchoring engine 180 can employ SLAM to anchor the digital representation on one or more feature points of the physical object by establishing a baseline parallax with the camera of the user-device 110 and performing parallel tracking and mapping, as described further in "Parallel Tracking and Mapping for Small AR Workspaces". In this case, once the digital twin is anchored to the image of the physical object on the display, the digital twin will remain anchored even when out of view. In particular, the user can move the user-device around, e.g., to provide different images to the display using the camera, and return to a view of the digital twin anchored on the physical object each time the user redirects the camera at the physical object. Other tracking techniques such as continuous tracking may also be used for generating/tracking the anchor points.

Each of the one or more systems, engines, and modules described in FIG. 1 can be implemented as a specialized hardware module, software module, or a collection of hardware and software modules. In particular, the identification engine 120, response engine 140, diagram and AR identification engine 150, rendering engine 170, and anchoring engine 180 can be implemented either separately or in some combination as specialized hardware, specialized software, or specialized hardware or specialized software modules.

Figure 2:
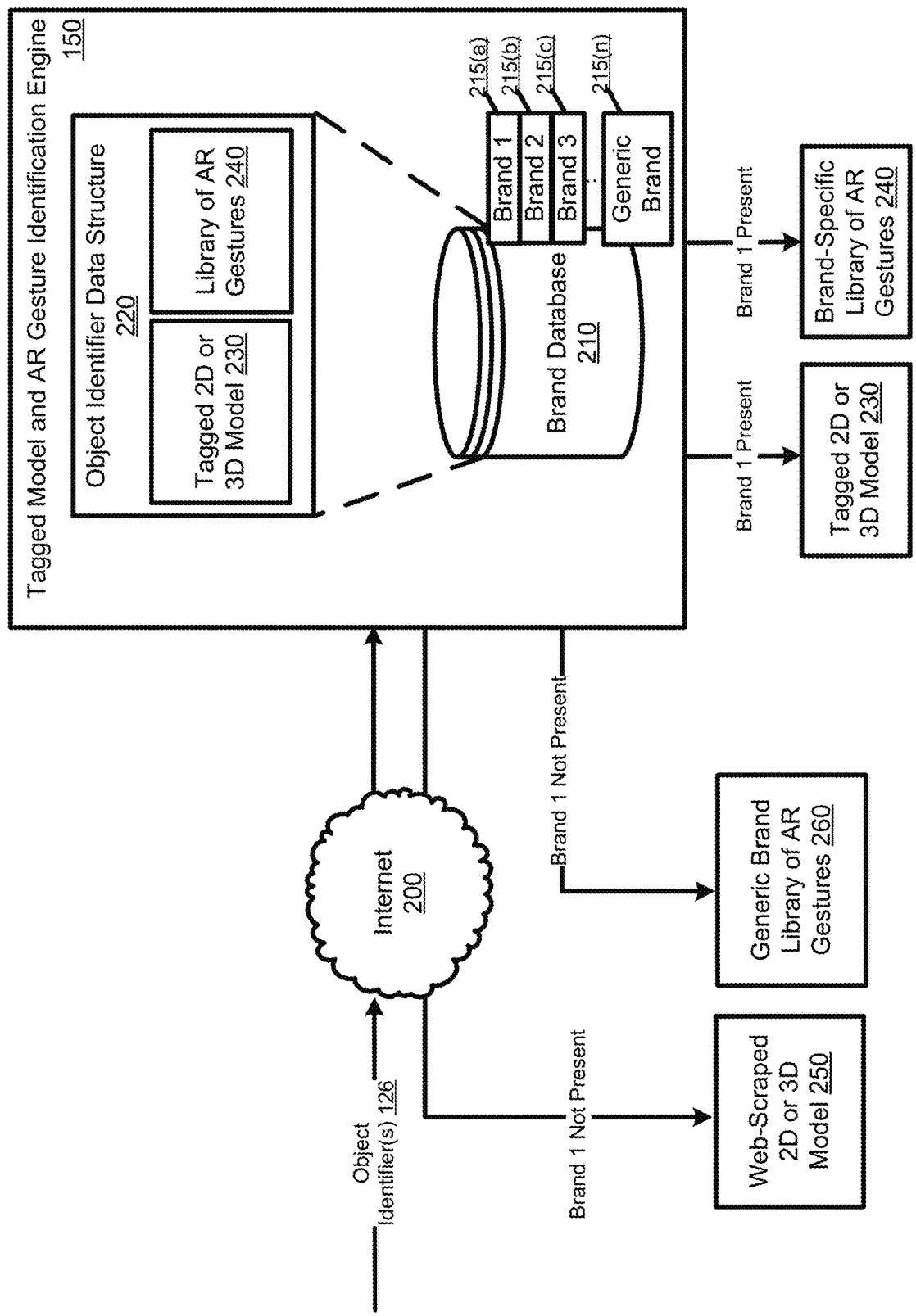
FIG. 2 is a system diagram of an example of a tagged model and gesture identification engine that can be used to obtain a diagram and gestures for an identified physical object.

FIG. 2 is a system diagram of a tagged model and gesture identification engine, e.g., the diagram and AR gesture identification engine 150 of FIG. 1, that demonstrates how the engine can identify a diagram and AR gestures for the digital representation using a brand database. As depicted in FIG. 1, the tagged model and AR gesture identification engine 150 can process one or more object identifiers 126, e.g., generated by the identification engine 120. In particular, the tagged model and AR gesture identification engine 150 can receive the object identifiers 126 using a network, such as the internet 200.

In the particular example depicted, the engine 150 can identify the corresponding diagram and AR gesture library for the physical object, e.g., the physical object of a query, using a brand database 210. The brand database can include one or more brand data structures, e.g., 215(a), 215(b), and 215(c), each of which contains one or more diagrams, e.g., 2D or 3D models for one or more products, and one or more libraries of AR gestures for the brand, e.g., specialized libraries of gesture-icons for a particular product or type of products. In some cases, the brand database 210 can additionally include a generic brand data structure 215(n), as will be described in further detail below. In some implementations, the AR gestures can be generated-potentially in real time-based on, for example, details about the corresponding physical objects.

In some implementations, the engine 150 can match the object identifiers 126 to the primary keys provided by each brand data structure, e.g., using database metadata that includes the one or more identifiers 126, to access the object identifier data structure 220 for a particular physical object. For example, the object identifier brand data structure 220 can contain a mapping using UPC as the primary key. Once accessed, the object identifier data structure 220 can include the diagram, e.g., the tagged 2D or 3D model 222, and the library of AR gestures 224 for the object identifier. In this particular example, the diagram is a tagged 2D or 3D model 230, where tagging refers to labelling specific portions, e.g., components, of the diagram of the physical object. For example, a tagged 2D or 3D model of a standing desk can include a depiction of the standing desk with a labeled top, motor, drawers, legs, and wheels. In some cases, the database 210 can be standardized to either maintain only 2D or only 3D models of the physical object in a particular object identifier data structure 220. In some cases, the database 210 can maintain both 2D and 3D models in the data structure 220. An example of a tagged 3D model for a weight scale will be covered in more detail in FIG. 3. The library of AR gestures 224 can include one or more gesture-icons, as will be described in further detail below.

As an example, the one or more object identifiers 126 can include a certain make and model of a microwave that the tagged model and AR gesture identification engine 150 can match to a given brand data structure for the make, e.g., the microwave brand, and then further match the model of the microwave to provide the object identifier data structure for the microwave that contains the tagged 2D or 3D model as the diagram of the physical object and the library of AR gestures. In particular, the tagged 2D or 3D model of the microwave can include a diagram with labeled components, e.g., labels for the door handle, the buttons, the rotating plate, etc., and the library of AR gestures can include gesture-icons depicting interactions with these components, e.g., a hand pulling open the door, pushing the buttons, and removing the rotating plate.

As an example, a gesture-icon can include a digital representation of a hand performing an action, e.g., pushing a button, opening a component, screwing something in, etc. In some cases, the gesture-icons further include an arm or another part of a virtual representation of a body, e.g., a foot to step on a component or a nose to smell something. As another example, the gesture-icon can include one or more items that can be associated with the physical object. In particular, the gesture-icon can include tools such as screwdrivers to screw in screws, hammers to hammer in nails, or wrenches to twist in bolts that can be used for physical object assembly or items that can be processed by or are related to the physical object, e.g., coffee beans that can be put into a coffee grinder, fruit that can be put into an ice cream maker, or gloves that should be worn when handling a part of the physical object.

More specifically, the tagged components of the tagged 2D or 3D model 230 can be associated with the sequence of actions generated by the system, e.g., the sequence of actions 160 generated by the response engine 140 of FIG. 1, by choosing one or more appropriate gesture-icons from the library of AR gestures 224 for each action. In some implementations, the rendering engine 180 of FIG. 1 can access the library of AR gestures 224, e.g., using the internet 200, to associate each action within the sequence of actions with a gesture-icon that corresponds with the action, as will be described in greater detail with respect to FIGS. 5 and 6.

In some cases, the contents of the brand data structures 215(a), 215(b), and 215(c) can be provided directly by the manufacturer to the system. In particular, the system, e.g., the automated remote guidance system 100 of FIG. 1, can enable manufacturers to upload tagged 2D models, tagged 3D models, or both 230 and libraries of AR gestures 240 for the purpose of providing remote guidance to users of the product using the system. As another example, the diagram can be sourced and scanned from user documentation for the physical object, e.g., a user manual for a consumer electronic device. As yet another example, the diagram can be located using the internet, e.g., via a search or automated scraping process for a 2D or 3D model of the physical object.

In an example, brand 1 is contained in the one or more object identifiers 126. In this case, the engine 150 can assess whether or not the brand, e.g., brand 1 is present in the brand database 210 after receiving the object identifiers 126, and, if so, can perform the primary key matching described above, to return the 2D or 3D model 230 and the brand-specific library of AR gestures 240. In the case that brand 1 is not present in the brand database 210, the engine 150 can use a library of generic AR gestures 260, e.g., provided by the generic brand data structure 215(n), and use a network, e.g., the internet 200, to search or scrape, e.g., search in an automated manner, the web for an available 2D or 3D model 250 using the object identifiers 126. In some cases, the engine 150 can incorporate the web-scraped 2D or 3D model into the brand database 210 after identifying the diagram, e.g., using the one or more object identifiers 126 to create a new object identifier data structure 220. In this case, the tagged model and AR gesture identification engine 150 can incorporate the object identifier data structure 220 into an existing brand data structure or create a new brand data structure if the brand is not currently maintained in the brand database 210.

Figure 3:
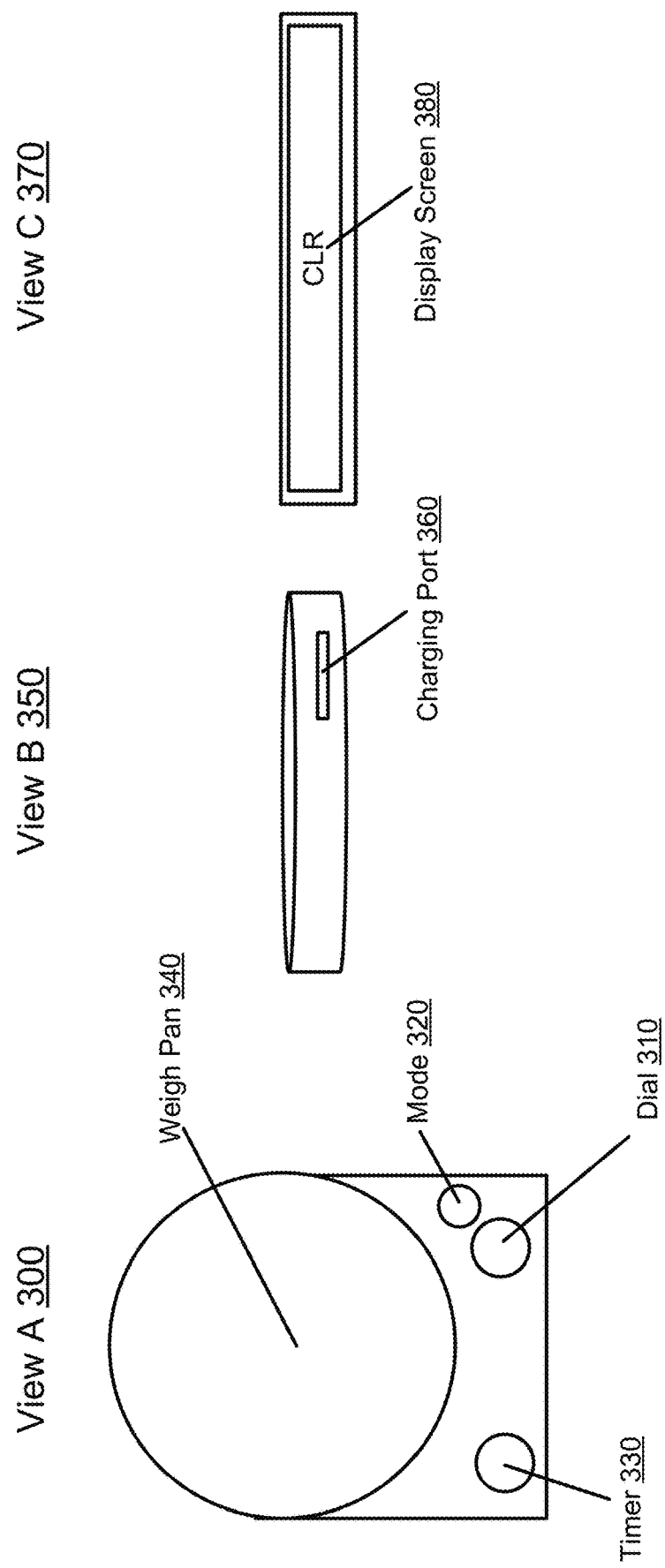
FIG. 3 is an example tagged 3D model of a digital coffee weight scale provided by the tagged model and gesture identification engine of FIG. 2.

FIG. 3 is an example of a diagram, e.g., a tagged 3D model of a digital coffee weight scale, that can be provided by the diagram and AR gesture identification engine of FIG. 1. As an example, the tagged 3D model can be identified using a brand database as described in FIG. 2, e.g., using the make and model of the digital coffee weight scale.

In the particular example depicted, the digital coffee weight scale can be used to increase the consistency of brewed pour-over coffee by enabling a user to directly control the ratio of coffee to water they use for each of their pours. The tagged 3D model of the weigh scale includes three views: view A 300, view B 350, and view C 370 with tagged portions, e.g., components in each view. In particular, view A 300 displays the top of the scale, including the tagged weigh pan 340, mode switch button 320, e.g., to switch between weighing water and coffee, dial 310, e.g., for controlling a brew ratio of water to coffee, and timer 330, e.g., for timing the percolation of the water through the coffee. View B 350 displays the back of the scale, which includes the tagged charging port 360, and View C 370 displays the display screen 380, e.g., for displaying the weight of the water or coffee.

In this case, the three views 300, 350, and 370 of the scale can be processed by a rendering engine, e.g., the rendering engine 170, and combined to construct a digital twin of the scale. In another implementation, the digital twin can be generated in real-time using a viewpoint projection model configured to process the one or more frame component inputs 122 of FIG. 1 to generate a diagram that can be rendered as the digital twin of the digital representation. As an example, photogrammetry can be used to create the 3D model by overlapping different frames of the physical object, e.g., different frames taken from a variety of perspectives, to convert them into a 2D or 3D model of the physical object. In some implementations, a digital twin can be obtained from the manufacturer of a corresponding physical object, or generated based on information (e.g., a computer-aided design (CAD) model) obtained from the manufacturer.

The one or more respective gesture-icons identified for each action of the identified sequence of actions can be overlayed on the digital twin as the digital representation. In particular, the rendering engine can identify one or more feature points, e.g., using the diagram, to associate the gesture-icon with the relevant portions of the digital twin. As an example, the feature points can be the tagged portions of the diagram, e.g., the labelled components of the 2D or 3D model. As another example, the feature points can be the edges of the 2D or 3D model. An example of the rendering engine providing remote guidance for the digital coffee weight scale by identifying and overlaying gesture-icons with respect to the relevant portions of the digital twin of the weight scale will be covered in more detail with respect to FIGS. 5 and 6.

Figure 4:
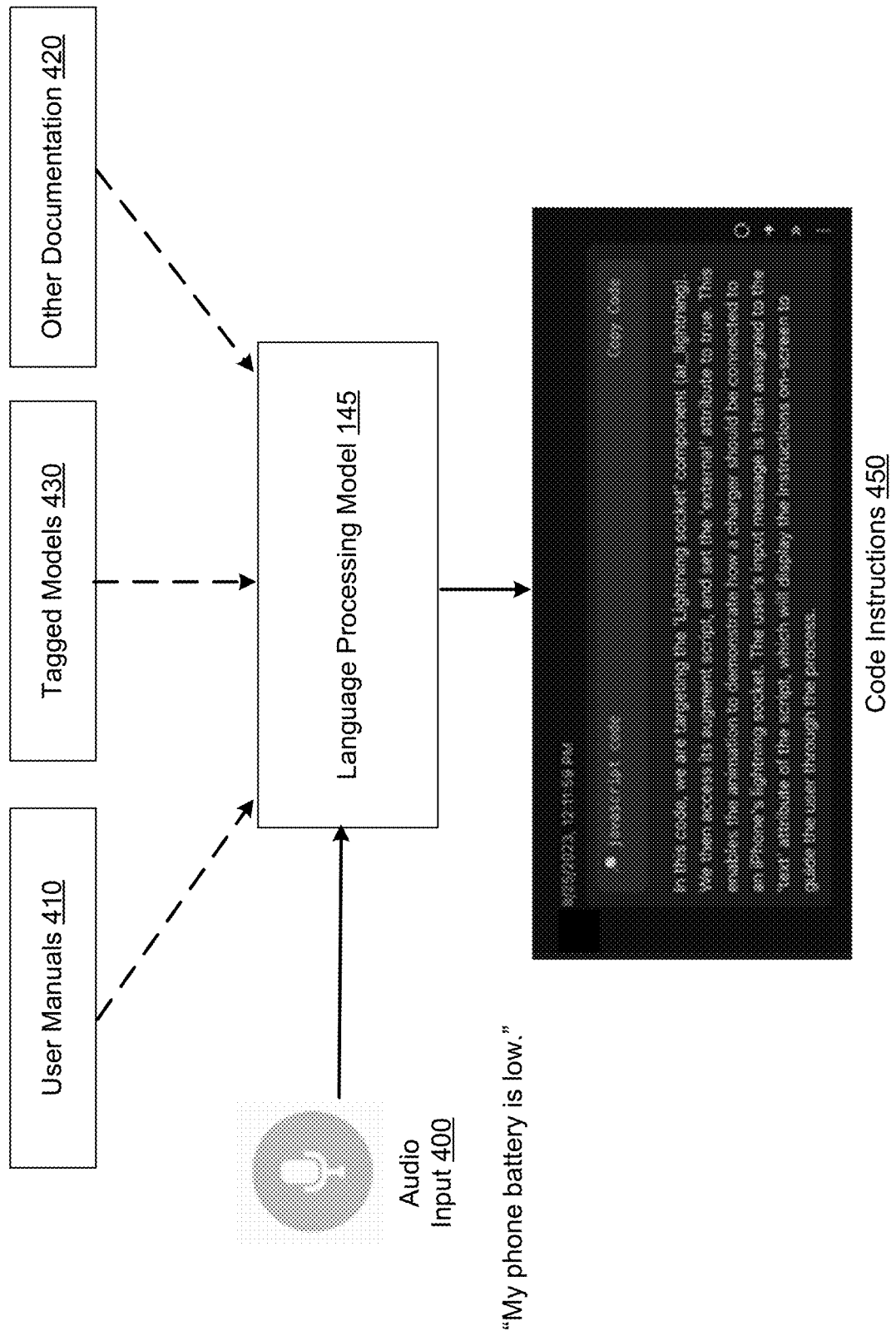
FIG. 4 is an example of a language processing model configured to generate the sequence of actions as code that can be rendered as a digital representation.

FIG. 4 is an example of a language processing model generating the sequence of actions as code for a rendering engine, e.g., the rendering engine 170. Using a language processing model to generate code, e.g., code that can be rendered, is a practical technique that can be applied in other applications as well to streamline a user's experience with the output of a language processing model.

In some implementations, the language processing model 145 is configured to process a query to generate code instructions 450, e.g., code that instructs the rendering engine how to render the sequence of actions as the response. In some cases, the language processing model 145 is configured to generate the sequence of actions, e.g., as text, and the rendering engine can process the sequence of actions to generate the code, e.g., using an additional language processing model. In particular, the code can include instructions to render the digital twin using the obtained diagram, e.g., the tagged 2D or 3D model of FIG. 2, and render each gesture-icon associated with each action in the sequence of actions in accordance with the portion of the diagram they pertain to.

In the particular example depicted, the sequence of actions generated as the code instructions 450 are for addressing the situation pertaining to a depleted phone battery. In particular, the user can record the audio input 400 as the query "my phone battery is low", and the language processing model 145 can generate code instructions 450 for the rendering engine to render a digital representation of how a charger can be connected to the phone's charging socket to charge the phone battery. In the particular example depicted, the code instructions 450 are provided in JavaScript and include instructions for rendering a digital representation that demonstrates how a charger can be connected to the charging port of the phone.

In some cases, the language processing model 145 can be trained on user documentation of physical objects, e.g., including user manuals 410, tagged models 420, e.g., tagged 2D or 3D models, and other documentation 420, such as publicly or privately available how-to videos, articles on best use, etc. to the system, e.g., the automated remote guidance system 100 of FIG. 1. More specifically, the language processing model 145 can train on a variety of sources that provide information about specific physical objects, e.g., consumer physical objects, to generate the sequence of actions the user should take as a response to their query. In some cases, the manufacturer of the physical object can provide the user manuals 410, tagged models 420, and other documentation 430 to the system. In some cases, or additionally, the system can search or scrape the internet for one or more physical object user manuals 410, tagged models 420, and other documentation 430 to train the language processing model 145.

In some implementations, the language processing model 145 is a large language model. As an example, the large language model can have been pretrained on a large corpus of generic documents, e.g., documents sourced by scraping the internet. In this case, the large language model can be finetuned, e.g., after pretraining, on the user manuals 410, tagged models 430, and other documentation 420. In particular, the large language model can be finetuned by freezing all but a subsection of weights, e.g., one or more layers of the neural network, and performing backpropagation to update the values of the unfrozen weights.

Figure 5F:
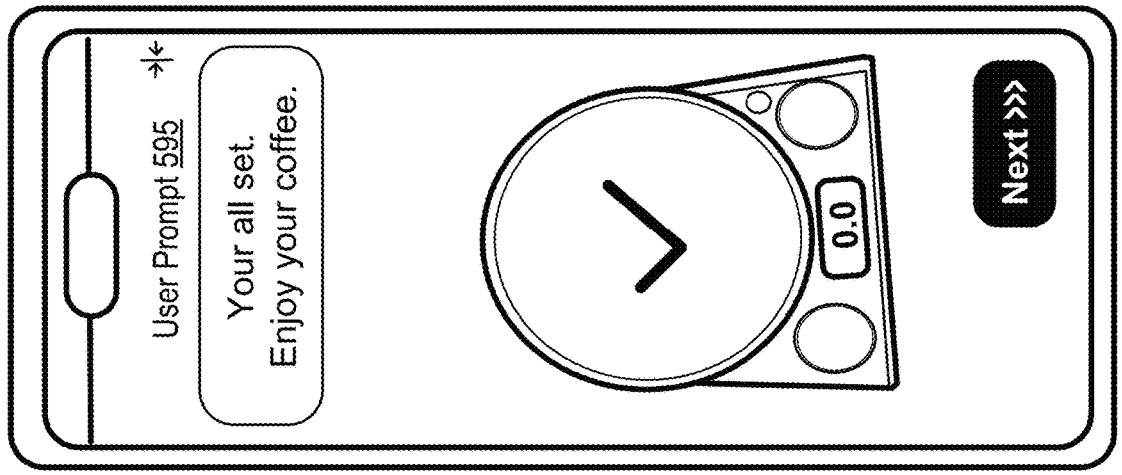
Figure 5E:
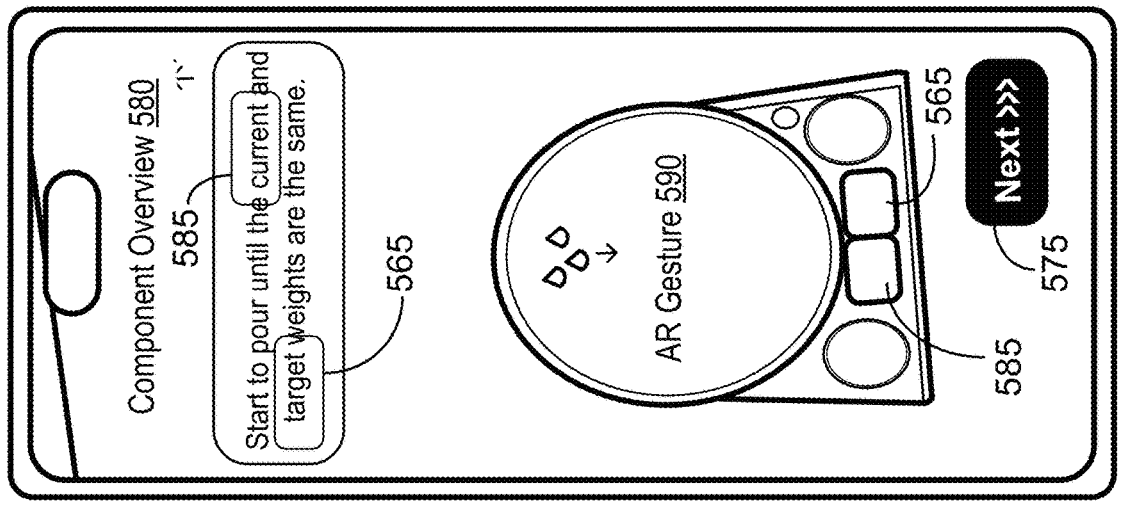
Figure 5D:
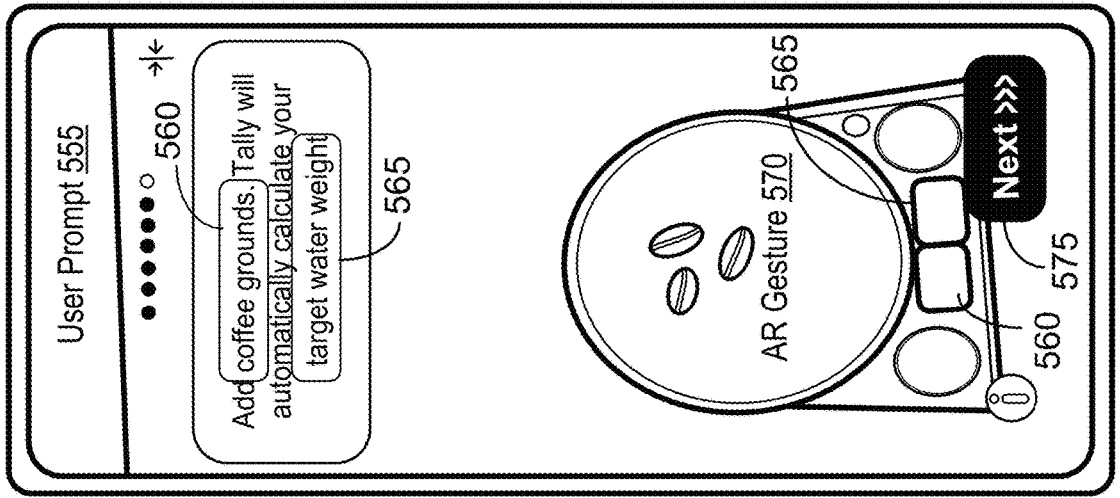

FIG. 5 illustrates an example of a digital representation provided by the system, e.g., the automated remote guidance system 100 of FIG. 1, in response to a query. In the particular example depicted, the digital representation of FIGS. 5A-5F are the response the system provides to a user-device with respect to a query regarding how to use the digital coffee weight scale depicted in FIG. 3 to brew pour-over coffee.

The digital representation of FIG. 5 is displayed on a smart phone, and a sequence of panels corresponding to FIGS. 5A-5F demonstrate an example user flow as provided by the automated remote guidance system, e.g., an advancement through the digital representation that leads the user of the system through an interaction with the physical object in response to their query. In particular, the digital representation can include one or more user prompts describing an interaction the user can take with the physical object and the gesture-icons, e.g., AR gesture 510 and AR gesture 550, correspond to an action in the sequence of actions. In this case, the sequence of actions include actions for brewing pour-over coffee using the digital coffee weight scale.

As illustrated in FIG. 5A, the digital twin of the physical object is constructed by a rendering engine, e.g., the rendering engine 170 of FIG. 1, and anchored to the image of the physical object on the display screen, e.g., the 3D model overlay 505. As an example, the system can anchor the 3D model overlay 510 to the image of the digital coffee weight scale using one or more autodetected feature points, e.g., feature points corresponding with the outline, components, or both of the digital coffee weight scale. In some implementations, the system can employ visual simultaneous localization and mapping (SLAM) to perform parallel tracking and mapping to autogenerate the feature points without any markers.

In the particular example depicted, the user prompt 500 dictates that the user orient the image of the scale on the display screen such that the "arrow is pointing up" and is associated with a corresponding augmented reality gesture 510 in which a hand is pressing a button under an arrow pointed upwards. In this case, the user prompt, e.g., the user prompt 510, can direct the user to align the image of the physical object on the display of the user-device with the digital twin of the digital representation to aid the system in performing the anchoring.

After the system has overlayed the digital twin with the corresponding image of the physical object on the user-device, the system can provide a component overview 515 of the different tagged components of the weigh scale as depicted in FIG. 5B. As illustrated in FIG. 5B, the system can provide the component overview 515 to familiarize the user with the weigh scale before displaying the gesture-icons for the actions in the sequence of actions the user can take to brew the pour-over coffee using the digital coffee weight scale. In particular, providing the component overview can streamline the end user experience with the AR by identifying the components of the physical object that the user can interact with, e.g., as specified by the digital representation. In this case, the components of the weight scale provided in the component overview 515 are sourced directly from the tagged 3D model of FIG. 3, e.g., the tagged 3D model sourced from the brand database 210 of FIG. 2. In the particular example depicted, the digital representation of the component overview 515 can include a mask overlay 520 for each of the components, e.g., the dial 530, mode button 528, timer 526, weigh pan 524, display 532, and charging port of the device 522, as tagged and labelled in the 3D model presented in FIG. 3.

In some cases, only some of the components of the physical object will be in the view provided by the initial anchored model, e.g., as depicted by the 3D model overlay 505 in FIG. 5A. In the particular example illustrated in FIG. 5B, the charging port is not in the depicted top view of the weigh pan. Since the digital twin is anchored to the image of the physical device in the example of FIG. 5, as the user moves the user-device around, the view of the digital twin can change in accordance with the reoriented views provided by the 3D model, which were used to construct the digital twin. For example, if the user orients the user-device to display an image of the weight scale that aligns with view B 350 of FIG. 3, the user will see the tagged charging port component. Additionally, as the user reorients the device from view A 300 to view B 350, the digital twin will remain anchored to the image of the device to provide the intermediate views between view A 300 and view B, e.g., the system can construct a digital twin using a 3D model that can remain anchored to the image of the physical object on the user-device display even as the user moves the device around to provide different views.

After the user has familiarized themselves with the components using the component overview 515, the user can advance the digital representation, e.g., using an advance button 535. In the example depicted in FIG. 5B, the user can control how they advance through the sequence of actions in the digital representation generated by the response engine. In some examples, the system can automatically advance the user through the sequence of actions in the digital representation, e.g., by recognizing a completed action or by advancing after a timeout period. In the case of presenting components 515, a system that auto-advances can present the component overview 515 to the user for a predetermined period of time, e.g., 20 seconds, 30 seconds, or 1 minute, before advancing to the next action in the sequence.

As illustrated in FIG. 5C, the system then presents the user with step 1, e.g., the first action in the sequence of actions, after the user elects to advance 535 to the first action in the sequence. In the particular example depicted in FIG. 5C, step 1 can include a user prompt 540 specifying a user interaction with the weight scale, e.g., the prompt 565 can include the instructions "Turn the dial until you see your preferred brew ratio on the screen," with highlighted components, e.g., the highlighted dial 530 and brew ratio 545. The highlighting can additionally indicate the dial 530 and brew ratio 545, on the components, e.g., the highlighted digital twin of the weigh scale, as depicted in the digital representation. In this example, the AR gesture 550 associated with the action is a spinning wheel over the dial 530, e.g., a spinning wheel 550 to demonstrate how the user can turn the dial to change their preferred brew ratio.

FIGS. 5D-5F illustrate the completion of the process for brewing pour-over using the weigh scale. In particular, the second action in the sequence of actions demonstrated in FIG. 5D includes the user prompt 555 instructing the user to "add coffee grounds" with corresponding highlighting 560 that indicate the component of the digital coffee weight scale that the action for "adding coffee grounds" corresponds with and an AR gesture 570 that displays an icon of coffee grounds being poured onto the weight scale. Additionally, the instructions of the user prompt 555 include the statement that "your target water weight will be automatically calculated", with corresponding highlighting 565 indicating where the target water weight will be displayed on the weight scale.

In the particular example depicted, the user can then advance to the next action in the sequence of actions using the advance button 575 after they have completed the action indicated by the digital representation of FIG. 5D to view the third action in the sequence of actions, as depicted in FIG. 5E. In some implementations, the system can detect that the user has completed the second action and auto-advance to the third action, e.g., by identifying that the user has added the appropriate amount of coffee beans. In particular, the third action can include a user prompt 5805 that can refer to pouring the target water weight, e.g., the target water weight 565 of FIG. 5D. In particular, the prompt 580 specifies to "start to pour until the current and target weights are the same" with corresponding highlighting 585 and 565 indicating where the current and target water weights will be displayed on the weight scale and an AR gesture 590 that displays an icon of water being poured onto the digital coffee weigh scale.

After the user has poured the target weight of water specified by the target weight 565, the user can advance to the next action in the sequence of actions, which is the completion of the sequence of actions. In this case, the completion is specified by the user prompt 595 indicating that the user has finished brewing their pour-over and can enjoy their coffee.

Figure 6:
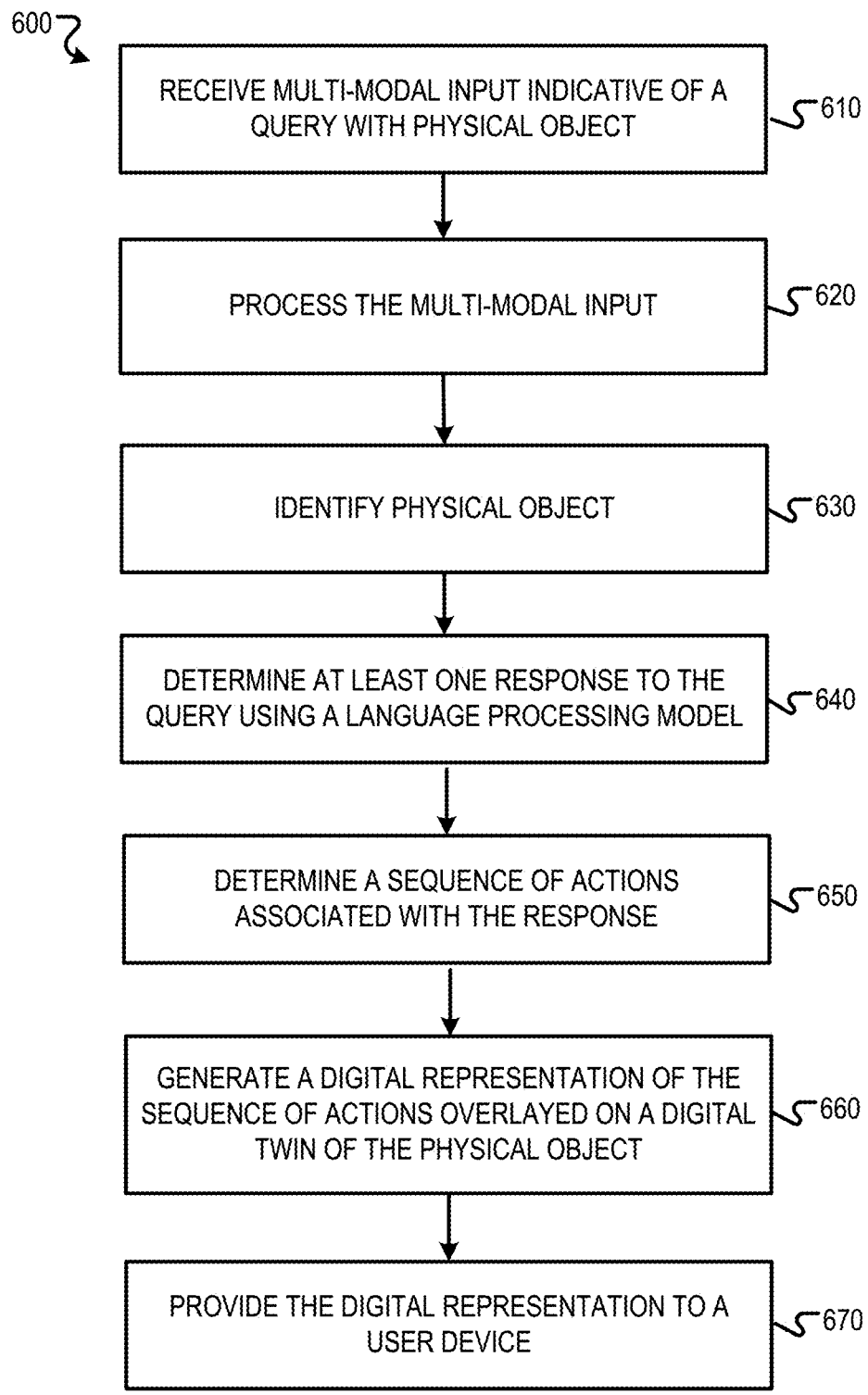
FIG. 6 is a flow chart of operations for generating a digital representation of a query response regarding a physical object using a language processing model.

FIG. 6 is a flow diagram of an example process for generating a digital representation of a query response regarding a physical object using a language processing model. For convenience, the process 600 will be described as being performed by a system of one or more computers located in one or more locations. For example, an automated remote guidance system, e.g., the automated remote guidance system 100 of FIG. 1, appropriately programmed in accordance with this specification, can perform the process 600.

The system can receive a multi-modal input indicative of a query with a physical object (step 610). The multi-modal input can include one or more frames of a video that depict the physical object and at least one of text, audio, or text and audio inputs that describe a query with respect to the physical object, e.g., a query a user has with the physical object. In a particular example, the multi-modal input can include a video of a washing machine that is stuck shut. As an example, the system can receive a multi-modal input from a user-device, such as a cell phone, tablet, smart-watch, smart-lens, etc. In particular, the system can receive one or more frames from the user-device camera and a text or audio input detailing the query the user has with the physical object. The query can be a question or statement regarding the physical object. In the particular case of the washing machine with stuck door, the user can ask "Why is my washing machine door stuck?" or state "My washing machine door is stuck".

The system can then process the multi-modal input (step 720), to identify the physical object (step 730). In some implementations, the system can process the one or more video frames using an identification engine to identify the physical object, e.g., the make and model of the washing machine. As an example, the system can identify the physical object using a computer vision model, e.g., a machine learning model that has been trained to perform object detection. In particular, the identification engine can generate one or more physical identifiers for the physical object that can be used to obtain additional information associated with the physical object, e.g., to locate a diagram, e.g., a 2D or 3D model, of the physical object and a library of augmented reality (AR) gestures for the physical object, e.g., using a database, such as a brand database The system can determine at least one response to the query using a language processing model (step 740). In particular, the language processing model can process the query, e.g., either the text, audio, or both text and audio inputs detailing the query with respect to the physical object and the identified physical object to determine at least one response to the query. As an example, the response can include an answer to an issue a user is facing with a physical object, e.g., the question regarding why the top lid of a washing machine will not open. As another example, the response can include instructions for the user with respect to the physical object, e.g., an overview of how to use a physical object such as a robot vacuum.

The system can determine a sequence of actions associated with the response (step 750). In particular, the sequence of actions can detail an interaction a user can take with the physical object that provides guidance with respect to their query. The system can generate a digital representation of the sequence of actions overlayed on a digital twin of the physical object (step 760). More specifically, the system can use a rendering engine to construct a digital twin of the physical object, e.g., using the obtained diagram, e.g., the 2D or 3D model of the physical object, and associate each action of the sequence of actions with a respective gesture-icon from the library of AR gestures. In the particular case of the washing machine, the system can construct a digital twin of the washing machine, e.g., using an obtained diagram of the washing machine, and generate a digital representation of gesture-icons overlayed on the digital twin, e.g., gesture-icons corresponding with trying to unlock the washing machine door by pushing buttons on the control panel.

The system can then provide the digital representation to a user-device (step 770). More specifically, the system can transmit the digital representation, e.g., the gesture-icons overlayed on the portions of the digital twin that the actions correspond with, to the user-device and render the digital representation on the display of the user-device as an augmented reality using a rendering engine. As an example, the rendering engine can provide the digital representation to the user on their device without the camera of the user-device being directed towards the physical object the query pertains to. As another example, the rendering engine can anchor the digital representation over an image of the physical object as represented on the user-device, e.g., as viewed on a display screen of the user-device from the user-device camera. Furthermore, in some cases, the system can identify a completion of each of the actions in the sequence to advance the digital representation to the next action in the sequence of actions. In other cases, a user can advance the system at the completion of each action to the next action in the sequence.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user-device, e.g., for purposes of displaying data to and receiving user input from a user interacting with the device, which acts as a client. Data generated at the user-device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving, at one or more computing devices, a multi-modal input representing a query associated with a physical object, wherein the multi-modal input comprises one or more frames of a video and at least one of text or audio component inputs;
    detecting, by the one or more computing devices, the physical object in the one or more frames using a machine learning model trained to perform object detection;
    determining, by the one or more computing devices, based in part on an identification of the physical object, at least one response to the query associated with the physical object, the at least one response being identified by processing the at least one of the text or audio component inputs using a language processing model;
    determining, by the one or more computing devices, a sequence of actions associated with the at least one response, the sequence of actions involving an interaction with at least one portion of the physical object;
    generating, by the one or more computing devices, a digital representation representing the sequence of actions on a virtual model of the physical object, the digital representation comprising: the virtual model of the physical object, and one or more gesture-icons representing the sequence of actions, each of the one or more gesture-icons being overlaid on corresponding portions of the virtual model of the physical object; and
    providing the digital representation to a user-device for presentation on a display, the digital representation being configured to be aligned in accordance with a changed orientation of the virtual model of the physical object on the display.

2. The method of claim 1, wherein receiving the multi-modal input further comprises collecting the multi-modal input at least in part using the user-device.

3. The method of claim 1, wherein detecting the physical object in the one or more frames using the machine learning model comprises:
    generating one or more identifiers for the physical object; and
    obtaining the digital twin in accordance with the one or more generated identifiers.

4. The method of claim 3, wherein obtaining the digital twin comprises:
locating the digital twin in a database of digital twins corresponding to various physical objects; or
scraping the internet to obtain the digital twin.

5. The method of claim 3, wherein obtaining the digital twin comprises generating the digital twin using a viewpoint projection model.

6. The method of claim 3, wherein determining the sequence of actions associated with the at least one response comprises:
identifying one or more portions of the digital twin in accordance with the response; and
generating one or more actions as the sequence of actions using the one or more identified portions of the physical object.

7. The method of claim 6, wherein the language processing model is trained to generate the sequence of actions through a prediction task, the training comprising:
training on documentation comprising one or more of frequently asked questions, user manuals, and diagrams for a plurality of physical objects; or
training on documentation sourced from the internet.

8. The method of claim 3, wherein generating the digital representation of the sequence of actions on the digital twin of the physical object comprises:
obtaining, from a gesture-icon library, a respective gesture-icon representing an action of the sequence of actions;
identifying one or more feature points to associate the gesture-icon with the relevant portions of the digital twin; and
generating code for a rendering engine configured to render the digital representation overlaid on the digital twin of the physical object using the one or more feature points.

9. The method of claim 8, wherein, providing the digital representation to the user-device for presentation on a display comprises:
transmitting the digital representation to the user-device; and
rendering the digital representation on the display of the user-device as an augmented reality presentation.

10. The method of claim 1, further comprising:
identifying completion of a first action in the sequence of actions, as represented in the digital representation; and
advancing to a second action in the sequence of actions, as represented in the digital representation.

11. A system comprising:
one or more computing devices; and
memory coupled to the one or more computing devices, the memory storing instructions, which when executed, cause the one or more computing devices to perform operations comprising:
receiving, a multi-modal input representing a query associated with a physical object, wherein the multi-modal input comprises one or more frames of a video and at least one of text or audio component inputs;
detecting the physical object in the one or more frames using a machine learning model trained to perform object detection;
determining based in part on an identification of the physical object, at least one response to the query associated with the physical object, the at least one response being identified by processing the at least one of the text or audio component inputs using a language processing model;
determining a sequence of actions associated with the at least one response, the sequence of actions involvinge an interaction with at least one portion of the physical object;
generating a digital representation representing the sequence of actions on a virtual model of the physical object, the digital representation comprising: the virtual model of the physical object, and one or morn gesture-icons representing the sequence of actions, each of the one or more gesture-icons being overlaid on corresponding portions of the virtual model of the physical object; and
providing the digital representation to a user-device for presentation on a display, the digital representation being configured to be aligned in accordance with a changed orientation of the virtual model of the physical object on the display.

12. The system of claim 11, wherein receiving the multi-modal input further comprises collecting the multi-modal input at least in part using the user-device.

13. The system of claim 11, wherein detecting the physical object in the one or more frames using the machine learning model:
generating one or more identifiers for the physical object; and
obtaining the digital twin in accordance with the one or more generated identifiers.

14. The system of claim 13, wherein obtaining the digital twin comprises generating the digital twin using a viewpoint projection model.

15. The system of claim 13, wherein determining the sequence of actions associated with the at least one response comprises:
identifying one or more portions of the digital twin in accordance with the response; and
generating one or more actions as the sequence of actions using the one or more identified portions of the physical object.

16. The system of claim 13, wherein t generating the digital representation of the sequence of actions on the digital twin of the physical object comprises:
obtaining, from a gesture-icon library, a respective gesture-icon representing the action;
identifying one or more feature points to associate the gesture-icon with relevant portions of the digital twin; and
generating code for a rendering engine configured to render the digital representation overlaid on the digital twin of the physical object using the one or more feature points.

17. The system of claim 11, wherein the operations further comprise:
identifying completion of a first action in the sequence of actions, as represented in the digital representation; and
advancing to a second action in the sequence of actions, as represented in the digital representation.

18. One or more non-transitory machine-readable storage media encoded with computer program instructions that when executed by one or more computing devices cause the one or more computing devices to perform operations comprising:
receiving a multi-modal input representing a query associated with a physical object, wherein the multi-modal input comprises one or more frames of a video and at least one of text or audio component inputs;

detecting the physical object in the one or more frames using a machine learning model trained to perform object detection;

determining based in part on an identification of the physical object, at least one response to the query associated with the physical object, the at least one response being identified by processing the at least one of the text or audio component inputs using a language processing model;

determining a sequence of actions associated with the at least one response, the sequence of actions involving an interaction with at least one portion of the physical object;

generating a digital representation representing the sequence of actions on a digital model of the physical object, the digital representation comprising: the virtual model of the physical object, and one or more gesture-icons representing the sequence of actions, each of the one or more gesture-icons being overlaid on corresponding portions of the virtual model of the physical object; and providing the digital representation to a user-device for presentation on a display, the digital representation being configured to be aligned in accordance with a changed orientation of the virtual model of the physical object on the display.

\* \* \* \* \*